A. GERHOLD.
VENTILATED BOOT OR SHOE.
APPLICATION FILED APR. 14, 1915.

1,202,827.

Patented Oct. 31, 1916.

Inventor:
Alfred Gerhold

UNITED STATES PATENT OFFICE.

ALFRED GERHOLD, OF LONDON, ENGLAND.

VENTILATED BOOT OR SHOE.

1,202,827.  Specification of Letters Patent. Patented Oct. 31, 1916.

Application filed April 14, 1915. Serial No. 21,202.

*To all whom it may concern:*

Be it known that I, ALFRED GERHOLD, a subject of the King of England, residing at London, England, have invented certain new and useful Improvements in Ventilated Boots or Shoes of which the following is a specification.

The present invention relates to improvements in the ventilation of boots and shoes.

It has been proposed to ventilate boots or shoes by orifices variously arranged in the shank of such foot-gear, one of the methods proposed consisting in providing an opening through the shank and securing in this a metal liner having flanges top and bottom, the metal liner being moreover covered by a plate having perforations in it and carrying a second perforated plate which could be moved to bring its orifices into or out of register with those in the fixed plate. This arrangement while being easy to manufacture and having little to get out of order, presented the disadvantage that as the movable plate was at the bottom of the shank it tended to admit water readily, and moreover as the heel wore down, the plate or part whereby it was moved was likely to get damaged in use by striking obstacles.

According to my invention the shank is provided with an aperture through it as before, but the movable cover-plate for controlling the admission of air through the aperture is mounted at or near the inner face of the shank and is so arranged as to be accessible from beneath the shank.

Preferably the aperture is covered by a fixed plate at or near the inner face of the shank, having in it a perforation, and the movable plate is preferably mounted on the under-side of the fixed plate so that it is housed within the aperture and is accessible from the under-side of the shank.

Figure 1:
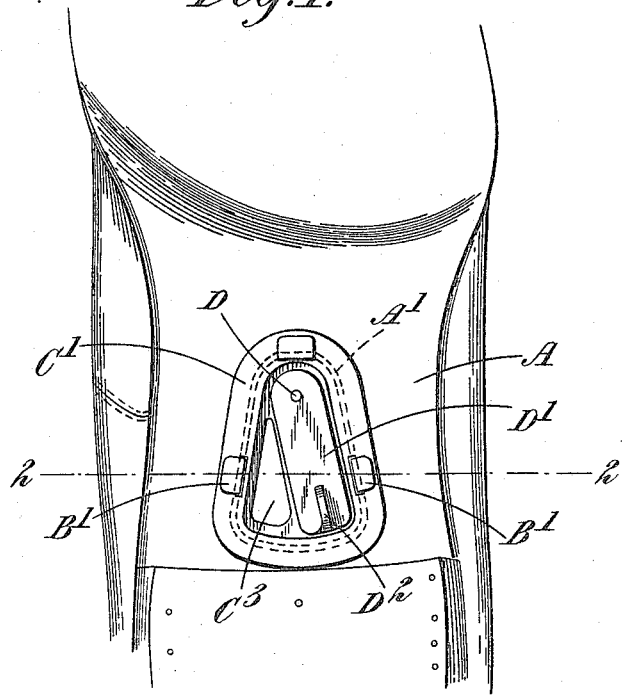
Figure 2:
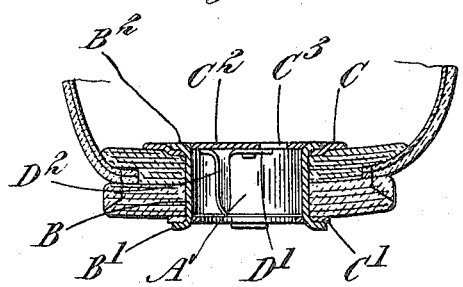

In the drawings:—Figure 1 is an under-side view of the shank of a boot having a ventilating device according to my invention, and Fig. 2 is a section on the line 2—2 of Fig. 1.

Like reference characters indicate like parts in both figures.

The shank A of a boot is provided with an aperture $A^1$ which, as indicated in Fig. 1, is narrower at the front end than at the rear end. This aperture is provided with a metal lining B having at top and bottom a number of tongues $B^1$, $B^2$. These tongues pass through an inner flange C and an outer flange $C^1$ and are bent over to hold the said flanges in place so that the lining and the flanges are adequately fastened together. The inner flange C has a continuation in the form of a plate $C^2$ situated across the aperture $A^1$ and this plate is provided with an orifice $C^3$ which is smaller than the aperture $A^1$.

Pivoted to the plate $C^2$ at D is a cover $D^1$ which as shown in Fig. 2 is housed in the aperture in the thickness of the shank. This cover has projecting outwardly a finger-piece $D^2$ which, as shown in Fig. 2, does not project beyond the bottom of the shank and by means of which the position of the cover may be readily adjusted to close or open the orifice $C^3$.

It will be seen that the arrangement of ventilator described has considerable advantages over those in which the movable plate is fixed at the bottom of the shank as by being at the top of the thickness of the shank close to the inner face of the shank, there is much less tendency for water to creep in between it and the plate $C^2$ and thus into the boot; moreover as the heel wears down, neither the cover-plate $D^1$ nor its operating-piece $D^2$ projects so as to be struck by obstacles.

What I claim as my invention and desire to secure by Letters Patent is:—

1. In a ventilated boot or shoe, the combination with a shank having an aperture therein which extends from the under-side of the shank to the interior of the boot or shoe, of a movable cover-plate for the aperture mounted near the inside of the boot or shoe but operable from beneath the shank, substantially as described.

2. In a ventilated boot or shoe, the combination of a shank having an aperture therein which extends from the under-side of the shank to the interior of the boot or shoe, a fixed plate situated across the aperture near the inside of the boot or shoe and having an orifice in it smaller than the aperture, and a movable cover-plate mounted on the fixed plate arranged to cover and uncover the aperture therein, substantially as described.

3. In a ventilated boot or shoe, the combination of a shank having an aperture therein which extends from the under-side of the shank to the interior of the boot or shoe, a fixed plate situated across the aperture near the inside of the boot or shoe and having an orifice in it smaller than the aperture, and a movable cover-plate mounted on the fixed plate arranged to cover and uncover the aperture therein, said cover-plate being housed in the aperture in the shank, substantially as described.

4. In a ventilated boot or shoe the combination of a shank having an aperture therein which extends right through the shank from the under-side, a liner for the aperture having at the under-side of the shank a flange which extends over the edges of the aperture and beds against the under-side of the shank, a plate on the upper-side of the shank which beds against the said upper-side and is secured to the liner, the said plate having an orifice in it, and a cover-plate for the orifice pivoted on the plate at the top of the shank but accessible from the under-side of the shank so that it can be moved over and away from the orifice as desired, substantially as described.

In testimony whereof I have signed my name to this specification in the presence of two subscribing witnesses.

ALFRED GERHOLD.

Witnesses:
HARRY S. BRIDGE,
JAMES T. MIDDLETON.

Copies of this patent may be obtained for five cents each, by addressing the "Commissioner of Patents, Washington, D. C."